United States Patent

Nelson et al.

Patent Number: 5,889,987
Date of Patent: Mar. 30, 1999

[54] FLEXIBLE NON-VOLATILE MEMORY CONTROLLER WITH BOOT BLOCK EMULATION

[75] Inventors: Albert Rudy Nelson; Tom Rampone, both of Hillsboro, Oreg.

[73] Assignee: Intel Corporation, Santa Clara, Calif.

[21] Appl. No.: 720,443

[22] Filed: Sep. 30, 1996

[51] Int. Cl.⁶ .................................................. G06F 9/00
[52] U.S. Cl. ............................................ 395/652; 711/103
[58] Field of Search .................................... 395/651, 652, 395/653; 711/100, 103

[56] References Cited

U.S. PATENT DOCUMENTS

| 5,579,522 | 11/1996 | Christeson et al. | 395/652 |
| 5,742,935 | 4/1998 | Hazen et al. | 711/152 |
| 5,752,063 | 5/1998 | DeRoo et al. | 395/830 |

*Primary Examiner*—Dennis M. Butler
*Attorney, Agent, or Firm*—Blakely, Sokoloff, Taylor & Zafman LLP

[57] ABSTRACT

A flexible non-volatile memory controller that provides external boot block protection and provides support for non-volatile memory devices having different sizes is disclosed. The flexible non-volatile memory controller includes a boot block protection unit that provides external boot block protection for a non-volatile memory device without internal boot block protection. The boot block protection unit prevents external devices from writing to a prespecified block of memory in the non-volatile memory device in a normal mode. The flexible non-volatile memory controller also includes a memory expansion unit that is adapted to control non-volatile memory devices having different sizes.

18 Claims, 4 Drawing Sheets

FLEXIBLE NON-VOLATILE MEMORY CONTROLLER WITH BOOT BLOCK EMULATION

BACKGROUND OF THE INVENTION

1. Field of the Invention

The present invention relates to the field of non-volatile memory devices. Specifically, the present invention is a method and apparatus for providing external boot block protection to a non-volatile memory device without an internal boot block protection and providing support for non-volatile memory devices that are currently not supported by hardware in the computer system.

2. Description of the Related Art

Typically, in a computer system, a read only memory (ROM) is employed to store non-volatile code that is used to initialize the computer system upon startup and to perform other housekeeping tasks for the computer system. For example, in a PC (personal computer) architecture, an AT motherboard is typically equipped with a non-volatile memory device (e.g., an electronically programmable Read Only Memory (EPROM)) that stores Basic Input/Output System (BIOS) code. BIOS code includes software routines that provide a low-level interface to devices in the computer system.

Advances in the non-volatile memory device arena have led to a ROM that is programmable in-circuit. For example, the electronically programmable read only memory (EPROM) is a non-volatile memory that is adapted to be programmed while connected to the motherboard.

The assignee of the present patent application has developed FLASH™[1] technology that provides a non-volatile memory that is adapted to be both erasable and programmable while in-circuit. FLASH™ technology provides the additional advantage of being able to erase blocks of the non-volatile memory, as well as being able to write to the non-volatile memory without having to remove the FLASH™ memory device from the motherboard. However, with the ability to erase portions of the non-volatile memory, the loss of important code becomes an important consideration. For example, if one were to accidentally erase the boot code stored in the non-volatile memory, the computer system then would not start up upon system startup.

[1]FLASH is a registered trademark of Intel Corporation.

In order to prevent the loss of important boot code, certain FLASH devices incorporate a boot block feature. In these memories, internal circuits ensure that all blocks except the boot block are erasable. The controller for these devices typically also have two modes of operation (i.e., a normal mode and a recovery mode). In the normal mode, BIOS code contained in the memory (e.g., ROM) is executed. In the recovery mode, after an error is detected in the BIOS code, the computer system can utilize the code in the boot block section of the ROM to boot a diskette and rebuild the BIOS code.

This prior art system has two notable shortcomings. First, a shortage in the market of FLASH devices that include this boot block feature would force motherboard manufacturers to exclude this boot block feature in the nonvolatile memory devices. In other words, the manufacturers would have to settle for a non-boot block non-volatile memory that provided no internal protection for important boot code. Second, as new features and associated code to support these new features are implemented in the non-volatile memory, the present system bus controller (also known as a bridge) may not be capable of accessing the entire memory area. Moreover, the devices having a boot block feature are typically more expensive. Furthermore, devices having the boot block feature are hardwired and not flexible for adapting to memories having different sizes. For example, bridge controllers decode a limited predetermined memory area (i.e., a memory having a fixed size). One solution to accommodate larger non-volatile memory devices is to redesign the system bridge. However, this option is costly and presents software and hardware compatibility problems.

Accordingly, a method and apparatus for providing external boot block protection to non-volatile memory devices without an internal boot block feature and for providing support for non-volatile devices having sizes that are not currently supported by the system bridge is desired.

SUMMARY OF THE INVENTION

The flexible non-volatile memory controller invention includes a block protection unit that protects a predefined block of addresses in the non-volatile memory by making this predefined block of addresses non-writable in a normal mode. The block protection unit includes a first input for receiving a signal that indicates whether the non-volatile memory device is in a normal mode or in a recovery mode. The block protection unit includes a second input for receiving an address to which a write operation is directed. The block protection unit determines if the address presented is within a protected block for the mode selected (i.e., the protected address block may vary depending on whether the non-volatile memory is in a normal mode or in a recovery mode). The flexible non-volatile memory controller also includes a flexible memory extension unit that is adapted to control non-volatile memory devices having at least two different sizes. The flexible extension unit includes an input for receiving selected data values from a data bus and based on these values generates at least one upper address bit that is provided to the non-volatile memory.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate the aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
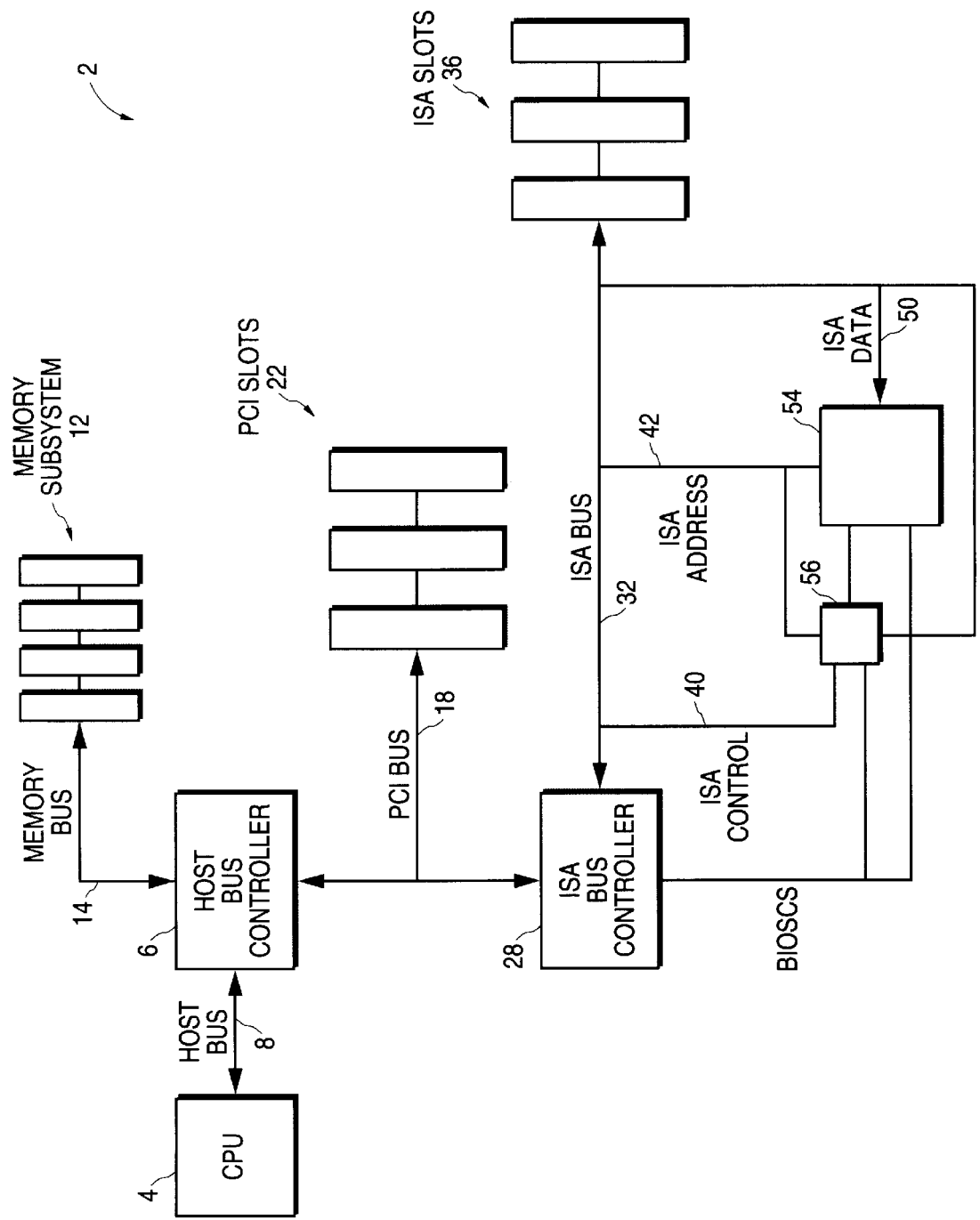
FIG. 1 illustrates a computer system in which the flexible non-volatile memory controller of the present invention may be implemented.

FIG. 1 illustrates a computer system in which the flexible non-volatile memory controller 56 may be implemented. This computer system 2 includes a processor 4 that is coupled to a host bus controller 6 via a host bus 8. The host bus 8 is typically a high speed processor bus configured in accordance to the processor 4. The host bus controller 6 allows the processor 4 to access a memory subsystem 12 via a memory bus 14. The host bus controller 6 also acts as a bridge between the host bus 8 and a local bus (e.g., a peripheral component interconnect (PCI) bus 18. The PCI bus 18 couples the host bus controller 6 to a plurality of bus slots 22. These slots may receive peripherals such as disk drives, network cards, and graphic cards. The computer system 2 also includes a system bus controller 28 that provides an interface between the local bus 18 and a system bus 32. The system bus may be an Industry Standard Architecture (ISA) bus that provides a connection to a plurality of system bus slots 36. These bus slots 36 are adapted to receive peripherals such as modems, keyboards and mouses. The ISA bus 32 provides the serial and parallel ports of the computer system 2.

The ISA bus 32, as defined by the ISA specification, includes control signals 40, the address signals 42 and data signals 50.

The computer system 2 further includes a non-volatile memory 54 (e.g., an electronically programmable read only memory (EPROM)) that is coupled to the ISA bus 32. This non-volatile memory 54 may be implemented using flash technology developed by the assignee of the present invention.

The computer system 2 also includes the present invention which is a flexible non-volatile memory controller 56, which is coupled to the system bus 32 and the non-volatile memory 54. The flexible non-volatile memory controller 56 provides external boot block protection for a non-boot block non-volatile memory device 54. The flexible non-volatile memory controller 56 also permits BIOS to access any area of the non-volatile memory 54 whether the non-volatile memory is a two megabit, four megabit, or eight megabit size memory. The BIOS code includes instructions that a processor follows. These instructions may instruct the processor to further access the BIOS code or values stored in the non-volatile memory. In a low level operating system, other applications can access the non-volatile memory 54. However, in high level operating systems (e.g., Windows) the operating system may not allow other applications to access the non-volatile memory 54. The present invention as embodied as the flexible non-volatile memory controller 56 will be described in greater detail hereinafter with reference to FIGS. 2 and 3.

Certain areas of non-volatile memory (e.g., a FLASH device) are required to be write protected. In normal mode, address xxxEC000-xxxEFFFFh required protection, and in recovery mode, address xxxFC000h-xxxFFFFFh require protection. This protection is normally embodied and implemented internally in the non-volatile memory (e.g., a "Boot Block Flash" on the PC motherboard). When using non boot block devices, the addresses noted above require write protection. Furthermore, when using oversized non-volatile memory devices, upper address lines need to be controlled because the chip select (BIOSCS signal) is decoded by the bus controller for a limited memory area.

The non-volatile memory controller 56 provides 1) external boot block protection for non-volatile memory without internal boot block protection, and 2) flexible adaptation with non-volatile memory devices of different sizes. The flexible non-volatile memory controller 56 may be implemented on a motherboard as a separate chip or integrated with a bus controller chip. Depending on particular design needs, the upper address signals (denoted Fx) may not all be used. These unused bits could function as memory mapped General Purpose/Output (GPO) bits to serve other control purposes.

Figure 2:
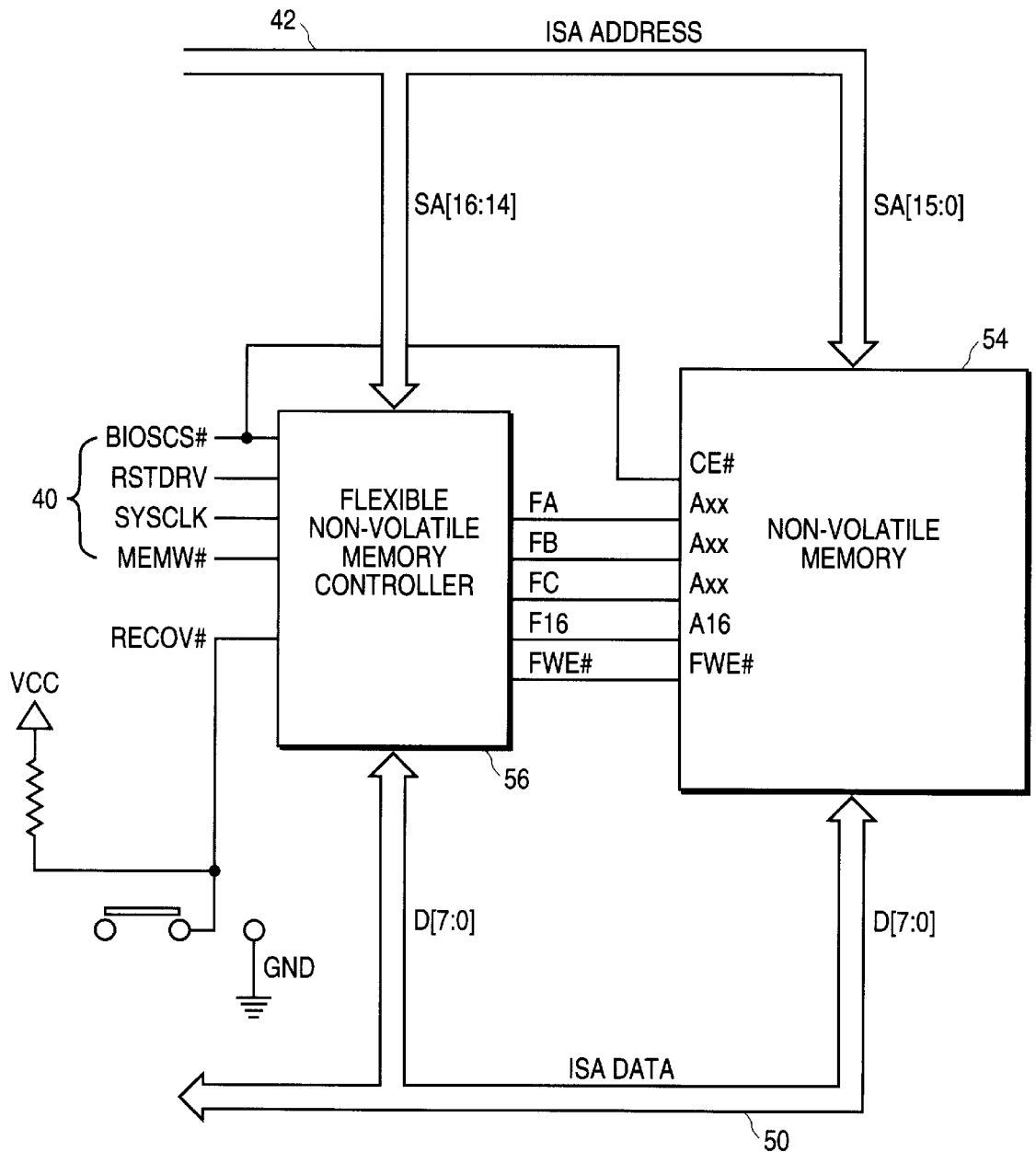
FIG. 2 is a block diagram illustrating how one embodiment of the flexible non-volatile memory controller of the present invention interacts with a non-volatile memory device.

FIG. 2 illustrates a block diagram of one embodiment of the flexible non-volatile memory controller 56 of the present invention. The flexible non-volatile memory controller 56 includes three ISA bus control signals: system clock (SYSCLK), reset signal: (RSTDRV), memory write signal (MEMW#). As is obvious from signal names, SYSCLK is simply the computer system clock; the RSTDRV signal simply resets the flexible non-volatile memory controller 56, and the MEMW# signal controls the writing of data into the non-volatile memory 54.

The flexible non-volatile memory controller 56 also includes a BIOSCS# signal, which is a chip select signal sent from the ISA bus controller 28. The BIOSCS# signal enables the flexible non-volatile memory controller 56. The flexible non-volatile memory controller 56 also includes an input for receiving a recovery signal (RECOV#). The RECOV# signal is coupled via a resistor 66 to a first reference voltage 68 (e.g., VCC). The RECOV# input is also coupled to a jumper 70 (i.e., a switch) that may be set by a user so that the RECOV# input is coupled to ground. When the jumper is set (i.e., when the RECOV# input is coupled to ground), the non-volatile memory controller 56 enters a recovery mode, (i.e., the non-volatile memory controller 56 has access to the area in the non-volatile memory 54 having the recovery code). This recovery mode will be explained in greater detail hereinafter.

In addition to these control signals, the flexible non-volatile memory controller 56 includes an input for receiving the system address (SA [16:14]) and an input for receiving data (D [7:5, 3:2]) from a system bus.

The non-volatile memory 54 includes an input for receiving the ISA system address 42. In this embodiment, addresses SA [15:0] are provided to the non-volatile memory 54. Moreover, the non-volatile memory 54 is coupled to the ISA data 44. Specifically, non-volatile memory 54 includes a plurality of bi-directional buffers for receiving and providing data bits (D[7:0]).

Based on the foregoing inputs, the flexible non-volatile memory controller 56 provides four address outputs (FA, FB, FC and F16) and one write control signal (i.e., FWE# signal).

The F16 signal is an inverted A16 signal if the non-volatile memory controller 56 is in a normal mode, otherwise it is not inverted. The signals FA, FB, FC are asserted (e.g., all logical high values) at power on and are independently set or cleared by the flexible non-volatile memory controller 56. Once set to a pattern, the address bits are effective (are active) for all subsequent read/write accesses until further modified. As noted previously, the write enable signal (FWE#), which is the write enable signal (WE#), provided by the computer system, qualified by the selected address bits and the recovery signal, is generated by the circuits illustrated in FIG. 5. For example, the write control unit, which will be described herein after in greater detail, allows access to all of the non-volatile memory 54 except a first region in a normal mode and a second region of memory in recovery mode.

Figure 3:
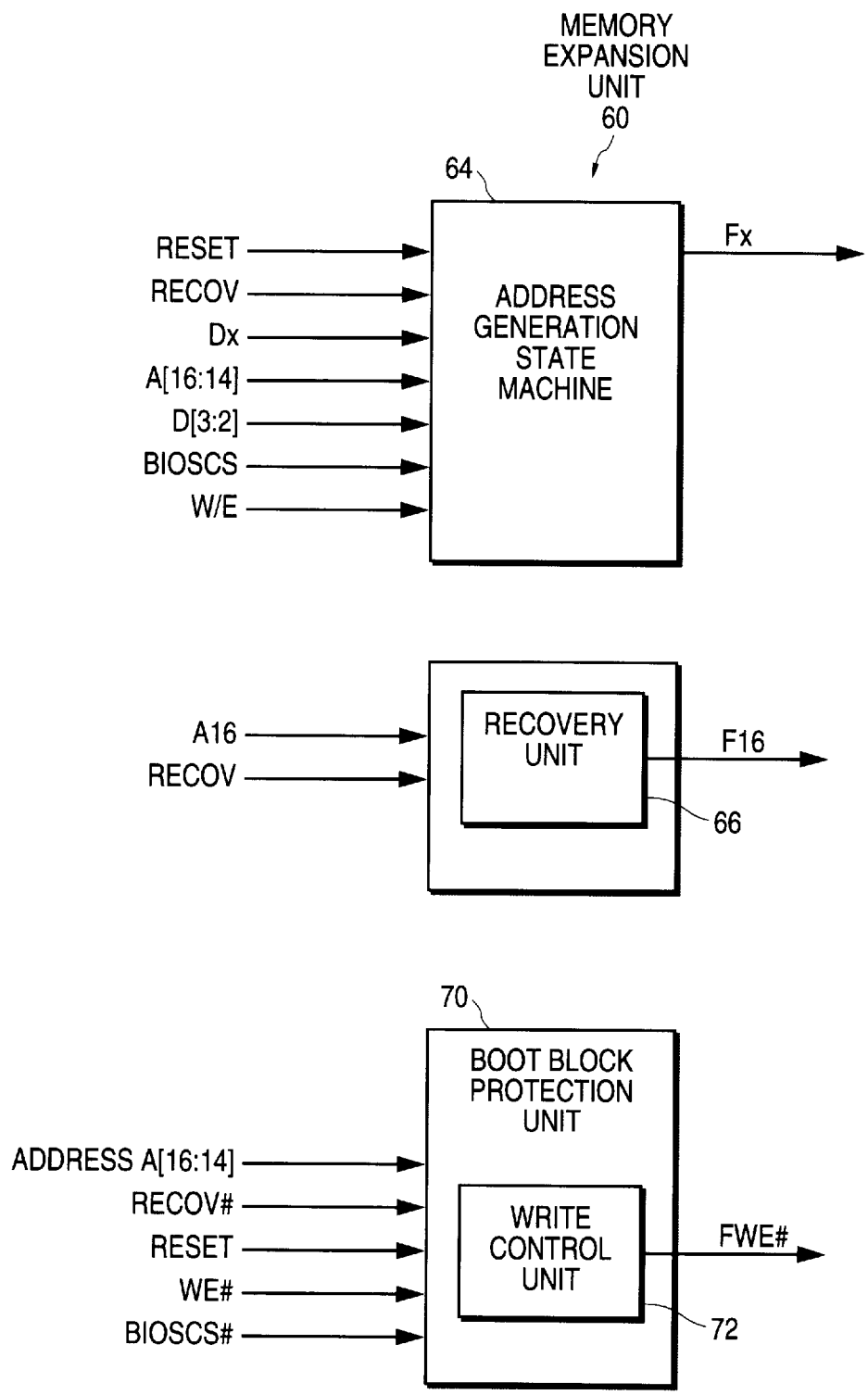
FIG. 3 is a block diagram illustrating in greater detail the flexible nonvolatile memory controller of one embodiment of the present invention.

FIG. 3 is a block diagram illustrating in greater detail the flexible non-volatile memory controller 56 of the present invention. The flexible non-volatile memory controller 56 includes a memory expansion unit 60 that flexibly adapts the non-volatile memory controller 56 to interface with non-volatile memory devices of different sizes. The memory expansion unit 60 includes an address generation state machine 64 that controls the FA, FB, and FC signals, denoted collectively as Fx. In this embodiment, five data bits (D [7:5, 3:2]) are used to determine whether or not signals FA, FB, FC are asserted or deasserted (i.e., logical high or low level). Two of the five data bits, provided to the flexible non-volatile memory controller 56, are used as a code so that unauthorized programming of the non-volatile memory 54 may be prevented. Based on the remaining three data bits, the memory expansion unit 60 selectively asserts or deasserts the FA, FB, and FC signals. The address generation state machine 64 will be described in greater detail hereinafter with reference to FIG. 4.

The non-volatile memory controller 56 also includes a recovery unit 66 that handles a recovery mode of the flexible non-volatile memory controller 56. The recovery unit 66 will be described in greater detail hereinafter with reference to FIG. 6.

The flexible non-volatile memory controller 56 also includes a boot block protection unit 70 that emulates an internal boot block feature for non-volatile memory devices 54 that do not have internal boot block protection. The boot block protection unit 70 includes a write control unit 72, illustrated in greater detail in FIG. 5, that controls write operations to the non-volatile memory 54. Specifically, the write control unit 72 qualifies a write enable signal (WE#), that is provided by the computer system, with selected address bits (A16, A15, A14) and a recovery signal (RECOV#). The write control unit 72 generates a FWE# signal that enables write operations to the non-volatile memory 54.

The present invention, as embodied in the flexible non-volatile memory controller 56, may be implemented as a programmable device such as a programmable logic array (PLA) or a EPLD (i.e. Electrically Programmable Logic Device). Appendix 1 illustrates suitable programmable array logic code that may be used to implement the flexible non-volatile memory controller 56 in accordance to one embodiment of the present invention.

Figure 4:
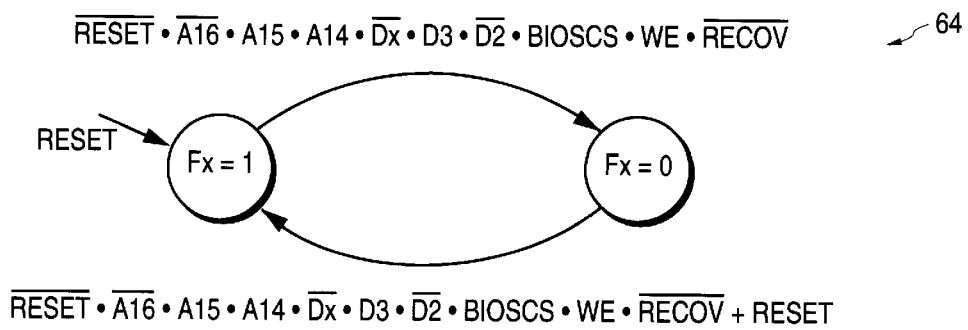
FIG. 4 is a state diagram for the memory expansion unit of FIG. 3.

FIG. 4 is a state diagram for the memory expansion unit 60, illustrated in FIG. 3. Address bits (FA, FB and FC) represented by state (Fx=1) and state (Fx=0) are set to a one at reset. These bits (FA, FB and FC) can be changed to either high or low depending on a command given the flexible non-volatile memory controller 56. Specifically, an address bit transitions from the (Fx=1) state to the (Fx=0) state when data bit Dx is deactivated. Moreover, an address bit transitions from the (Fx=0) state to the (Fx=1) state when data bit Dx is active or upon reset. In the embodiment, the Dx bit corresponds to D7, D6 or D5 depending on the Fx output to be changed. For example, if FA is to be changed, bit D7 is asserted. The memory expansion unit 60 also can condition access to control the non-volatile memory 54 upper address bits (FA, FB, FC) based upon whether a proper predetermined bit states (e.g., a code) are present on D3 and D2.

Writing to the flexible non-volatile memory controller 56 to control the non-volatile memory 54 address bits is done from normal mode when the data bits D[3,2] specify a predetermined code (e.g., 10b). The data bits D[7:5] contain a desired state of the respective non-volatile memory 54 address signals FC, FB and FA. Writing a one sets the associated non-volatile memory 54 address bit (i.e., D7=FC, D6=FB and D5=FA). Once an address bit has been set or cleared, it remains so until again being changed by the programming described previously or upon a RESET. Any combination of the upper addresses is supported on these bits. Data bus bits D0, D1 and D4 are not connected and as such do not affect the control of the flexible non-volatile memory controller 56.

The control of address bits FA, FB, FC can be accomplished via the flexible non-volatile memory controller 56 by performing a write to a write protected address area of the non-volatile memory 54 in normal mode which is xxxEC000h. Since the flexible non-volatile memory controller 56 only decodes A16-14, a write to any address in the address range will work.

Figure 5:
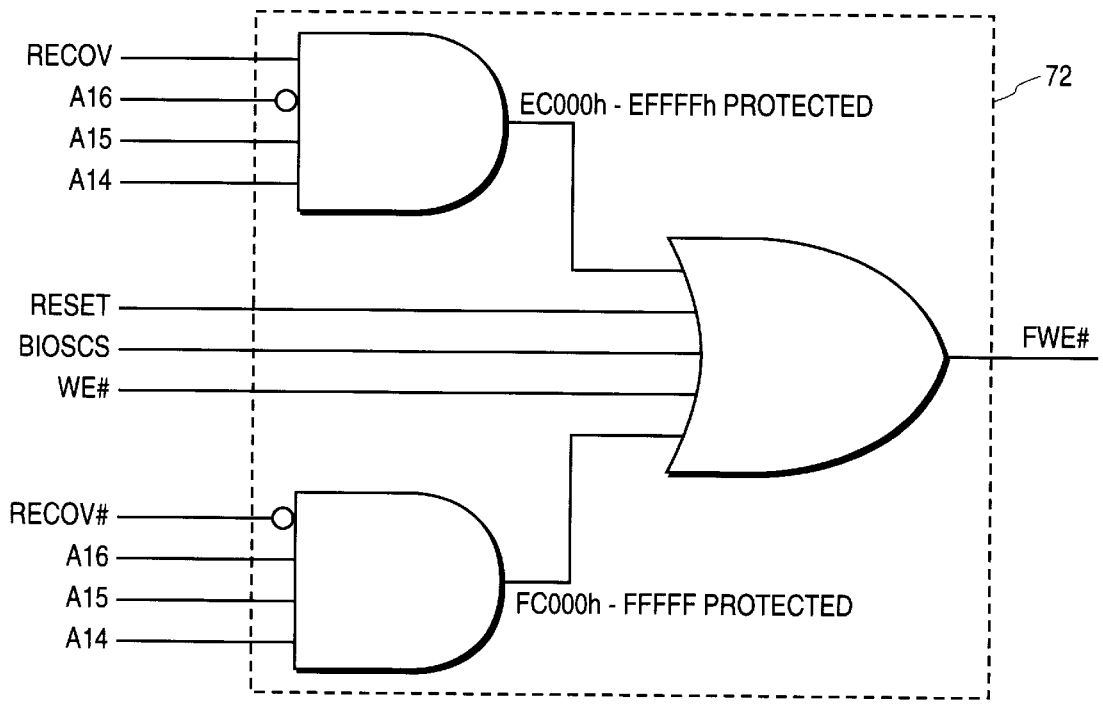
FIG. 5 is a circuit diagram for the boot block protection of FIG. 3.

FIG. 5 is a circuit diagram illustrating the boot block protection unit 70 of the flexible non-volatile memory controller 56, as illustrated in FIG. 3. The boot block protection unit 70, which is external to the non-volatile memory 54, emulates an internal boot block feature for the non-volatile memory 54. The boot block protection unit 70 includes a write control unit 72 that blocks write access to the non-volatile memory 54 for the write protected regions specified above. The write control unit 72 generates FWE signal in a normal mode only if the address of the write is not protected.

Figure 6:
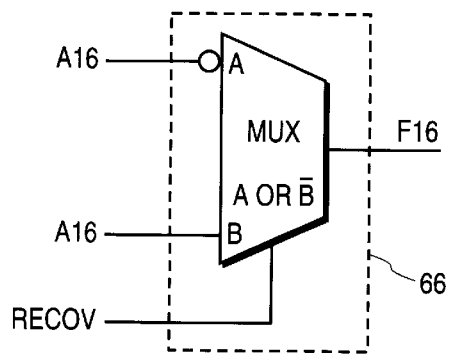
FIG. 6 illustrates in greater detail the recovery unit of FIG. 3.

FIG. 6 illustrates the address bit generator for the embodiment of the present invention illustrated in FIG. 3. The inversion of address bit F16 is controlled by a user selected recovery jumper (i.e., a switch) (not shown) that generates the RECOV signal. The recovery unit 66 employs the RECOV signal to select between A16 and an inverted A16. When in normal mode, the A16 bit is inverted to become F16; in recovery mode A16 is not inverted.

In summary, the flexible non-volatile memory controller 56 acts as an interface between the non-volatile memory 54 and the system bus signals. The flexible non-volatile memory controller 56 block writes to certain restricted sections of the non-volatile memory 54. The protected areas (i.e., regions in memory that are protected from writes) varies depending on the mode of the non-volatile memory 54. The non-volatile memory includes two modes: a normal mode or recovery mode. The flexible non-volatile memory controller 56 includes an emulator for emulating a boot block function (i.e., a recovery mode function).

The memory expansion unit 60 controls the state of selected upper address bits (FA, FB, FC and F16) of the non-volatile memory 54. By selectively setting or clearing these address bits, the memory expansion unit 60 effectively swaps in and out different memory areas at the same low order memory address. The memory expansion unit 60 enables many blocks in the non-volatile memory device to be interchangeable. Accordingly, these blocks of memory are accessible by BIOS code at many address locations when not in recovery mode.

The present invention provides many advantages over the prior art. First, the flexible non-volatile memory controller 56 allows for the use of non-boot-block non-volatile memory devices and still retain a boot block structure in the computer system. Second, the flexible non-volatile memory controller 56 flexibly adapts to non-volatile memory (e.g., EPROM) devices to different sizes. Third, the flexible non-volatile memory controller 56 supports existing Flash Memory Update Programs (FMUPs) and recovery software. This FMUP software is used to upgrade a user's BIOS in the field, and the recovery software is used to recover BIOS from a corrupted state.

This flexible non-volatile memory controller 56 provides support for multiple types and sizes of flash devices (bootblack or flashfile) on motherboards by:

1) Emulating a write-protected boot-block area (typically 16K in size) and supporting an external BIOS recovery jumper;
2) Supporting programmable control of 3 upper address bits FC, FB, FA as needed by BIOS to access various blocks of memory; and
3) Limiting access to the flexible non-volatile memory controller 56 to change the address bits.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

---

CHIP FLASHPAL 85C220

```
PIN 1 SYSCLK    ; CLOCK INPUT FROM ISA SYSCLK
PIN 2 D2        ; ISA DATA BIT 2
PIN 3 D3        ; ISA DATA BIT 3
PIN 4 D5        ; ISA DATA BIT 4
PIN 5 D6        ; ISA DATA BIT 5
PIN 6 RESET     ; INPUT, ISA RESET
PIN 7 D7        ; ISA DATA BIT 7
PIN 8 A14       ; INPUT, ISA ADDRESS BIT
PIN 9 A15       ; INPUT, ISA ADDRESS BIT
PIN 10 GND

PIN 11 A16      ; INPUT, ISA ADDRESS BIT
PIN 12 /WE      ; INPUT, ISA MEMW-
PIN 13 /BIOSCS  ; INPUT, FROM PIIX
PIN 14 FC       ; OUTPUT NORMALLY CONNECTED TO FLASH
                  ADDRESS 19
PIN 15 FB       ; OUTPUT NORMALLY CONNECTED TO FLASH
                  ADDRESS 18
PIN 16 FWE      ; OUTPUT CONNECTED TO FLASH WRITE PIN,
                  ACTIVE LOW AT THE FLASH
PIN 17 FA       ; OUTPUT NORMALLY CONNECTED TO FLASH
                  ADDRESS 17
PIN 18 F16      ; OUTPUT NORMALLY CONNECTED TO FLASH
                  ADDRESS 16
PIN 19 /RECOV   ; INPUT, A JUMPER SETTING FOR RECOVERY
                  MODE, LOW = RECOVERY
PIN 20 VCC

EQUATIONS

FWE.TRST = VCC
FWE = /RESET * BIOSCS * WE * /RECOV * /A16 * A15 * A14
; ECXXX IS WRITE
                              ; PROTECTED IN NORMAL MODE
    + /RESET * BIOSCS * WE * RECOV * A16 * A15 * A14;
    FCXXX IS WRITE
                              ; PROTECTED IN RECOVERY MODE
    + RESET                   ; PROTECTED DURING RESET
    + /WE      ; PROTECTED ALSO WHEN NOT DOING WRITES

F16.TRST = VCC  ; INVERT SA16 IN NORMAL MODE
F16 = /RESET * RECOV * A16
    + /RESET * /RECOV * A16
    + RESET

FC := /RESET * D7 * D3 * /D2 * BIOSCS * WE * /RECOV * /A16 *
      A15 * A14
    + RESET
    + /RESET * FC * /WE
FC.TRST = VCC ; CONTROL FC BIT, SET IT AT RESET OR IF
WRITTEN TO A HIGH
FC.SETF = GND

FB := /RESET * D6 * D3 * /D2 * BIOSCS * WE * /RECOV * /A16 *
      A15 * A14
    + RESET
    + /RESET * FB * /WE
FB.TRST = VCC ; CONTROL FB BIT, SET IT AT RESET OR IF
WRITTEN TO A HIGH
FB.RSTF = GND
FA := /RESET * D5 * D3 * /D2 * BIOSCS * WE * /RECOV * /A16 *
      A15 * A14
    + RESET
    + /RESET * FA * /WE
FA.TRST = VCC ; CONTROL FA BIT, SET IT AT RESET OR IF
WRITTEN TO A HIGH
FA.RSTF = GND
```

What is claimed is:

1. A flexible non-volatile memory controller, coupled to a non-volatile memory, said non-volatile memory without internal boot block protection, said non-volatile memory controller comprising:
    a) a boot block protection unit having a normal mode and a recovery mode, wherein a block of addresses in said non-volatile memory are protected from a write operation in the normal mode if a target write address is within said block of addresses; and
    b) a memory expansion unit to enable said flexible non-volatile memory controller to control non-volatile memories of at least two different sizes.

2. The flexible non-volatile memory controller of claim 1, wherein the boot block protection unit includes a write control unit, said write control unit having a first input for receiving a write command, a second input for receiving selected address bits of said target write address, a third input for receiving a recovery signal, said write control unit, responsive to said write command, selected address bits and recovery signal, to generate and provide a write enable signal to said non-volatile memory.

3. The flexible non-volatile memory controller of claim 1, wherein the memory expansion unit includes a first input to receive a data signal, and a second input to receive a reset signal, said memory expansion unit, responsive to said data signal and reset signal, selectively asserting at least one upper address bit of said non-volatile memory when accommodating non-volatile memory of different sizes.

4. The flexible non-volatile memory controller of claim 3 wherein said memory expansion unit further includes a third input for receiving a target address, said memory expansion unit determining if said target address is within said block of addresses, and if so, providing a first data signal to the non-volatile memory device as an upper address signal.

5. The flexible non-volatile memory controller of claim 4 wherein said memory expansion unit further includes a fourth input for receiving a second data signal, said memory expansion unit determining if said second data signal is a predetermined check code, and if so, providing said first data signal as an upper address signal to said non-volatile memory device.

6. The flexible non-volatile memory controller of claim 5 wherein said memory expansion unit includes a fifth input for receiving said recovery signal, said recovery signal indicating the mode of said non-volatile memory device controller;

wherein the memory expansion unit provides the first data signal as an upper address bit to the non-volatile memory device based on the state of said recovery signal.

7. A computer system comprising
a) a peripheral bus;
b) a peripheral bus controller, coupled to said peripheral bus, to manage bus access by devices coupled to said peripheral bus;
c) a non-volatile memory, coupled to said peripheral bus, said non-volatile memory without internal boot block protection; and
d) a flexible non-volatile memory controller coupled to the non-volatile memory, said flexible non-volatile memory controller including a boot block protection unit having a normal mode protecting a block of addresses in said non-volatile memory from a write operation if a target write address is within said block of addresses, and a memory expansion unit to enable said flexible non-volatile memory controller to control non-volatile memories of at least two different sizes.

8. The computer system of claim 7 wherein the boot block protection unit includes a write control unit, said write control unit having a first input for receiving a write command, a second input for receiving selected address bits of a target write address to which the write command is directed, a third input for receiving a recovery signal, said write control unit responsive to said write command, selected address bits and recovery signal, to generate and provide a write enable signal to said non-volatile memory.

9. The computer system of claim 7 wherein the memory expansion unit includes a first input to receive a data signal, and a second input to receive a reset signal, said memory expansion unit, responsive to said data signal and reset signal, selectively asserting at least one upper address bit of said non-volatile memory when accommodating non-volatile memories of different sizes.

10. The computer system of claim 9 wherein said memory expansion unit further includes a third input for receiving a target address, said memory expansion unit determining if said target address is within said block of addresses, and if so, providing a first data signal to the non-volatile memory device as an upper address signal.

11. The computer system of claim 10 wherein said memory expansion unit further includes a fourth input for receiving a second data signal, said memory expansion unit determining if said second data signal is a predetermined check code, and if so, providing said first data signal as an upper address signal to said non-volatile memory device.

12. The computer system of claim 11 wherein said memory expansion unit includes a fifth input for receiving said recovery signal, said recovery signal indicating the mode of said non-volatile memory device controller;
wherein the memory expansion unit provides the first data signal as an upper address bit to the non-volatile memory device based on the state of said recovery signal.

13. A memory controller comprising:
a boot block protection unit to selectively write protect a block of addresses in a remote non-volatile memory when the memory controller is in a first of a plurality of operating modes; and
a memory expansion unit to enable the memory controller to control remote non-volatile memories of different sizes.

14. The memory controller of claim 13, wherein the boot block protection unit includes a write control unit having a first input to receive a write command, a second input to receive selected address bits of said target write address, and a third input to receive a recovery signal, wherein said write control unit is responsive to said write command, address bits and recovery signal to generate and provide a write enable signal to an external non-volatile memory.

15. The memory controller of claim 13, wherein the memory expansion unit includes a first input to receive a data signal, and a second input to receive a reset signal, wherein the memory expansion unit is responsive to said data signal and reset signal to selectively assert at least one upper address bit of said non-volatile memory when accommodating non-volatile memories of different sizes.

16. The memory controller of claim 15, wherein said memory expansion unit further comprises a third input to receive a target address, wherein said memory expansion unit determines if said target address is within said protected block of addresses to provide a first data signal as an upper address bit to the remote non-volatile memory.

17. The memory controller of claim 16, wherein said memory expansion unit further comprises a fourth input to receive a second data signal, wherein said memory expansion unit determines if said second data signal is a predetermined check code to provide said first data signal as an upper address bit to the remote non-volatile memory.

18. The memory controller of claim 13, wherein said memory controller includes a second operating mode to enable write operations to the block of addresses protected while operating in the first operating mode.

* * * * *